(12) United States Patent
Tien

(10) Patent No.: US 12,258,165 B1
(45) Date of Patent: Mar. 25, 2025

(54) CONFECTIONARY GOODS DELIVERY SYSTEM

(71) Applicant: KACF LLC, Essex Fells, NJ (US)

(72) Inventor: Albert Tien, Essex Fells, NJ (US)

(73) Assignee: KACF LLC, Essex Fells, NJ (US)

( * ) Notice: Subject to any disclaimer, the term of this patent is extended or adjusted under 35 U.S.C. 154(b) by 0 days.

(21) Appl. No.: 18/372,038

(22) Filed: Sep. 22, 2023

(51) Int. Cl.
| B65B 5/00 | (2006.01) |
| A21D 13/80 | (2017.01) |
| B65B 5/12 | (2006.01) |
| B65C 3/06 | (2006.01) |

(52) U.S. Cl.
CPC ............... B65B 5/12 (2013.01); A21D 13/80 (2017.01); B65C 3/065 (2013.01)

(58) Field of Classification Search
CPC ................................ B65D 85/36; B65D 85/60
See application file for complete search history.

(56) References Cited

U.S. PATENT DOCUMENTS

| 4,102,728 | A * | 7/1978 | Smith | G09F 3/0286 |
| | | | | 53/291 |
| 8,235,712 | B1 * | 8/2012 | Lewis | B65D 23/0878 |
| | | | | 432/143 |
| 9,516,961 | B1 * | 12/2016 | Yambao | B65D 23/14 |
| 2004/0251162 | A1 * | 12/2004 | McGinnis | A45C 11/20 |
| | | | | 206/485 |
| 2010/0018969 | A1 * | 1/2010 | Marks | B65D 43/162 |
| | | | | 220/361 |
| 2011/0016828 | A1 * | 1/2011 | Parker | B65B 7/2835 |
| | | | | 53/317 |
| 2011/0048997 | A1 * | 3/2011 | Vandervliet | B65D 1/26 |
| | | | | 206/493 |
| 2011/0314772 | A1 * | 12/2011 | George | B65D 23/0878 |
| | | | | 428/36.6 |
| 2014/0041341 | A1 * | 2/2014 | Koolhaas | B65B 53/02 |
| | | | | 53/442 |
| 2016/0136668 | A1 * | 5/2016 | Kelly | B05B 11/0008 |
| | | | | 53/431 |
| 2016/0325900 | A1 * | 11/2016 | Stone | B65D 75/324 |
| 2019/0055082 | A1 * | 2/2019 | Guirguis | B65D 51/245 |
| 2020/0307900 | A1 * | 10/2020 | Parikh | B65D 43/22 |

FOREIGN PATENT DOCUMENTS

| WO | WO-2018081086 A1 * | 5/2018 |
| WO | WO-2019050917 A1 * | 3/2019 |

* cited by examiner

*Primary Examiner* — Eyamindae C Jallow
(74) *Attorney, Agent, or Firm* — Bochner PLLC; Andrew D Bochner; Eric R Kleinertz

(57) ABSTRACT

An embodiment of a confectionary good delivery apparatus comprising: a delivery apparatus comprising: a mouth comprising; an upper aperture; and a lower aperture; a storage basin; and a concealment label disposed upon an outside surface of the storage basin; at least one baked layer disposed within the storage basin comprising; an upper baked layer circumference; a lower baked layer circumference; the lower baked layer circumference smaller than the upper baked layer circumference; and a baked layer sidewall disposed between the upper baked layer circumference and the lower baked layer circumference; and at least one glaze layer disposed atop the at least one baked layer.

14 Claims, 5 Drawing Sheets

CONFECTIONARY GOODS DELIVERY SYSTEM

FIELD OF THE INVENTION

The present disclosure is directed to a confectionary goods delivery system. More specifically, the present disclosure is directed to a confectionary goods delivery system capable of reducing food waste and providing consumers with a visually appealing confectionary product.

INTRODUCTION

Dessert can be used to refer to the course concluding a meal. However, dessert colloquially refers to a confectionary product that is oftentimes consumed at any time throughout the day. Dessert foods come in a variety of forms, encompassing everything from baked goods to frozen indulgences. One of the most popular contemporary desserts is cake.

Precursors to modern cakes were first baked in $17^{th}$ century Europe. Originally, cake was more characteristic of bread that was sweetened with honey or fruit. Over time, cake has evolved, and is no longer similar to its bread-like composition of old, which in-part, can be attributed to the substitution of yeast for baking soda as a rising agent. Since said substitution, cake has become a staple of celebrations around the world. However, cake typically is served on a plate, and as such, is not easily transported. In response, innovations, such as, cupcakes and cake-in-a-jar, have been brought to the dessert industry to make cake more transportable.

Commonly, cake-in-a-jar is comprised of sheet cake, cut into circular portions, that are ultimately deposited into a wide-mouth mason jar. Typically, a single circular portion of the sheet cake is placed into the wide-mouth mason jar and is covered with a layer of frosting prior to a second circular portion of sheet cake being deposited into the jar. However, due to the circular cuts required for this process, such pieces of sheet cake leave wasted portions of cake between each cut. Thus, the conventional process of making a cake-in-a-jar does not utilize the entirety of a rectangular sheet cake. In effect, this conventional process leaves an abundance of leftover pieces that are ultimately thrown out. Another common problem associated with traditional cake-in-a-jar, is that the layers of frosting, separating the layers of cake, are prone to smearing. Consequently, a traditional cake-in-a jar product, with smeared frosting inside of the jar, is not aesthetically pleasing for the consumer, especially if said jar is being given as a gift.

Accordingly, it would be desirable to reduce the amount of cake that ends up as waste when filling a mason jar for cake jar style desserts. It would be further desirable to provide a confectionary goods delivery system capable of concealing imperfections of cake-in-a-jar products resulting from the smearing and/or streaking of frosting or cake. However, it would be yet further desirable to provide a system capable of concealing imperfections of the cake, while permitting visualization of the desired portions of the cake.

SUMMARY

This Summary is provided to introduce a selection of concepts in a simplified form that are further described below in the Detailed Description. This Summary is not intended to identify key features or essential features, nor is it intended to limit the scope of the claims included herewith.

Provided may be a confectionary goods delivery apparatus comprising: a delivery apparatus comprising; a mouth comprising; an upper aperture; and a lower aperture; a storage basin; and a concealment label disposed upon an outside surface of the storage basin; at least one baked layer disposed within the storage basin comprising; an upper baked layer circumference; a lower baked layer circumference; the lower baked layer circumference smaller than the upper baked layer circumference; and a baked layer sidewall disposed between the upper baked layer circumference and the lower baked layer circumference; and at least one glaze layer disposed atop the at least one baked layer.

In another embodiment, the confectionary goods delivery apparatus, wherein the concealment layer is a heat-shrink label.

In an embodiment, the confectionary goods delivery apparatus, wherein the at least one baked layer is comprised of; a first baked layer; and a second baked layer. Further, the confectionary goods delivery apparatus, wherein the at least one glaze layer is comprised of; a first glaze layer disposed between the first baked layer and the second baked layer; and a second glaze layer disposed atop the second baked layer.

In a further embodiment, the confectionary goods delivery apparatus, wherein the at least one baked layer is a cupcake. Additionally, the confectionary goods delivery apparatus, wherein the at least one glaze layer is a frosting mixture.

In yet a further embodiment, the confectionary goods delivery apparatus further comprises a delivery apparatus topper disposed within the mouth. Moreover, the confectionary goods delivery apparatus, wherein the delivery apparatus topper is comprised of a chocolate mixture. Moreover, the confectionary goods delivery apparatus, wherein the delivery apparatus topper further comprises a hollow cavity. Furthermore, the confectionary goods delivery apparatus, wherein the hollow cavity is filled with a topper filling.

In an embodiment, a confectionary goods delivery system comprises a delivery apparatus comprising: a mouth comprising an upper aperture, and a lower aperture; a storage basin comprising an inner surface and an outside surface; a concealment banner disposed upon the outside surface of the storage basin; a concealment label disposed upon the outside surface of the storage basin and below the concealment banner, wherein the concealment banner and the concealment label are opaque, a first window defined along the outside surface below the concealment label; a second window defined along the outside surface between the concealment label and the concealment banner; a third window defined along the outside surface above the concealment banner, wherein the first window, the second window, and the third window are transparent; and a first baked layer disposed within the storage basin, the first baked layer disposed adjacent to the first window and a portion of the concealment label, the first baked layer comprising: a first baked layer height; a first upper baked layer circumference; a first lower baked layer circumference, the first lower baked layer circumference having a smaller diameter than the first upper baked layer circumference; and a first baked layer sidewall angularly disposed between the first upper baked layer circumference and the first lower baked layer circumference, wherein the first baked layer sidewall is configured to conform to the inner surface of the storage basin; a second baked layer disposed within the storage basin, the second baked layer disposed adjacent to a portion of the concealment label, the second window, and the concealment banner, the second baked layer comprising: a second baked layer height, wherein the second baked layer height is equal to the first baked layer height; a second upper baked layer circumference; a second lower baked layer circumference, the second lower baked layer circumference having a smaller diameter than the second upper baked layer circumference; and a second baked layer sidewall angularly disposed between the second upper baked layer circumference and the second lower baked layer circumference, wherein the second baked layer sidewall is configured to conform to an inner surface of the storage basin; a first glaze layer disposed between the first upper baked layer circumference and the second lower baked layer circumference; and a second glaze layer disposed atop the second upper baked layer, the second glaze layer disposed adjacent to a portion of the concealment banner and a portion of the third window.

BRIEF DESCRIPTION OF THE DRAWINGS

The incorporated drawings, which are incorporated in and constitute a part of this specification exemplify the aspects of the present disclosure and, together with the description, explain and illustrate principles of this disclosure.

DETAILED DESCRIPTION

In the following detailed description, reference will be made to the accompanying drawing(s), in which identical functional elements are designated with like numerals. The aforementioned accompanying drawings show by way of illustration, and not by way of limitation, specific aspects, and implementations consistent with principles of this disclosure. These implementations are described in sufficient detail to enable those skilled in the art to practice the disclosure and it is to be understood that other implementations may be utilized and that structural changes and/or substitutions of various elements may be made without departing from the scope and spirit of this disclosure. The following detailed description is, therefore, not to be construed in a limited sense.

It is noted that description herein is not intended as an extensive overview, and as such, concepts may be simplified in the interests of clarity and brevity.

All documents mentioned in this application are hereby incorporated by reference in their entirety. Any process described in this application may be performed in any order and may omit any of the steps in the process. Processes may also be combined with other processes or steps of other processes.

The confectionary goods delivery system (herein the "delivery system") 100 may include a delivery apparatus 210. The delivery apparatus 210 may be comprised of at least a mouth, a storage basin, and/or a concealment label 270.

Figure 2:
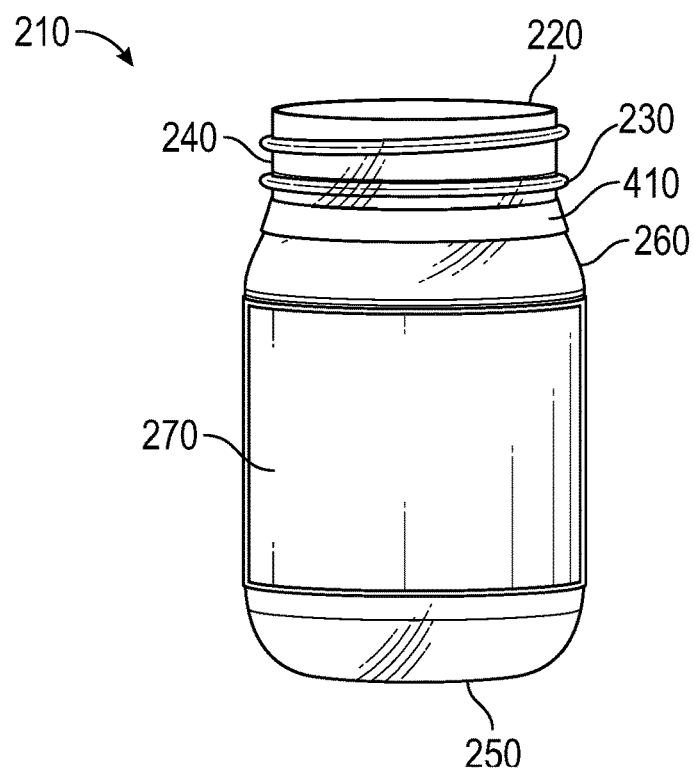
FIG. 2 is an illustration of an embodiment of a delivery apparatus.
Figure 3:
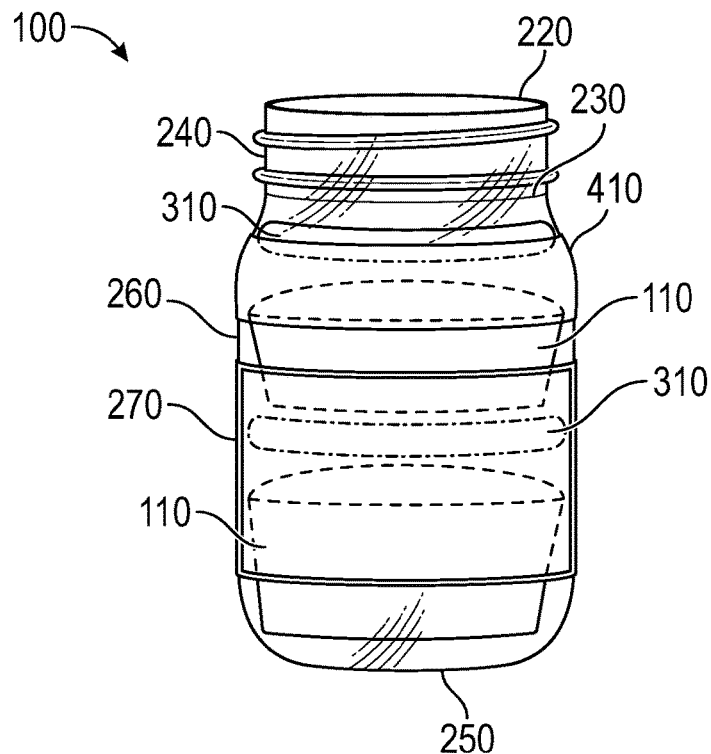
FIG. 3 is an illustration of an embodiment of a confectionary goods delivery system.

Referring to FIGS. 2-3, the delivery apparatus 210 may be comprised of a container. In an embodiment, the container may be a mason jar. Additionally, said mason jar may be at least one of a wide-mouth mason jar, a regular-mouth mason jar, and a small-mouth or narrow-mouth mason jar. However, the delivery apparatus 210 may be comprised of any suitable container alternative and is not limited to a mason jar.

In an embodiment, the mouth may be comprised of an upper aperture 220 and/or a lower aperture 230. Further, the mouth may be further comprised of a mouth sidewall 240 disposed between the upper aperture 220 and the lower aperture 230. In another embodiment, the upper aperture 220 and the lower aperture 230 (hereinafter the "apertures") may take on an aperture shape. In another embodiment, the aperture shape may be a circle. However, the aperture shape may be comprised of any suitable shape alternative (e.g., square, oval, etc.). In an embodiment, the upper aperture 220 and the lower aperture 230 may be of the same circumference, for example, such that the mouth sidewall 240 is both annular and strictly vertical. However, in various embodiments, the mouth sidewall 240 may be disposed in any suitable position.

The mouth may be disposed atop the storage basin. In an embodiment, the storage basin may be comprised of a basin base 250 and a basin sidewall 260. In an embodiment, the basin sidewall 260 may be attached, such that said attachment is airtight, to the basin base 250, such that said attachment is impermeable. In another embodiment, the basin sidewall 260 attaches to the basin base 250, to form a basin cavity within the storage basin. In such an embodiment, the basin base 250, attaches to the basin sidewall 260 at a first end or second end of the basin sidewall 260, to create an opening at the first end or the second end of the basin sidewall 260. Further, the basin cavity may be configured to receive and/or store an outside object. In a further embodiment, the mouth may be attached, such that said attachment is airtight, to the first end or the second end of the basin sidewall 260. In such an embodiment, the mouth and the basin sidewall 260 may be in fluid communication, such that outside objects may transverse the mouth and may be received by the storage basin. In another embodiment, the base 250 may be attached at the first end of the basin sidewall 260 and the mouth may be attached to the second end of the basin sidewall 260 or vice versa. In an embodiment, the basin sidewall 260 may have a circumference greater than that of the mouth.

Figure 1:
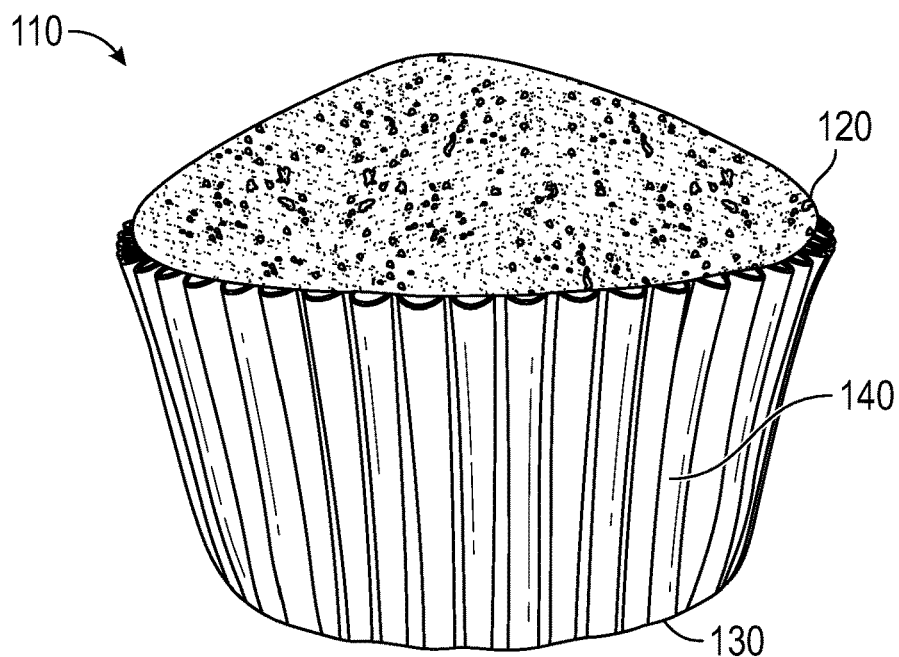
FIG. 1 is an illustration of an embodiment of a baked good configurable as a baked layer of a delivery apparatus.

Referring to FIG. 1, the delivery system 100 may be further comprised of at least one baked layer 110. The at least one baked layer 110 may comprise a baked good. In an embodiment, the baked good may include a cupcake. However, the at least one baked layer 110 may be comprised of any baked good alternative (e.g., cake, tarts, muffins, etc.). In a further embodiment, the at least one baked layer 110 may be disposed within the storage basin. In such an embodiment, the at least one baked layer 110 may transverse the mouth and be placed within the basin cavity, such that the at least one baked layer 110 abuts the basin base 250.

The at least one baked layer 110 may have an upper baked layer circumference 120. Additionally, the at least one baked layer 110 may be further comprised of a lower baked layer circumference 130. In an embodiment, a baked layer sidewall 140 may be disposed between the upper baked layer circumference 120 and the lower baked layer circumference 130. In a further embodiment, the upper baked layer circumference 120 may have a larger diameter than the lower baked layer circumference 130. In such an embodiment, the baked layer sidewall 140 may be angularly disposed between the upper baked layer circumference 120 and the lower baked layer circumference 130. In an alternative embodiment, the lower baked layer circumference 130 may have a larger diameter than the upper baked layer circumference 120. In such an embodiment, the baked layer sidewall 140 may be angularly disposed between the upper baked layer circumference 120 and the lower baked layer circumference 130. In an alternate embodiment, the upper baked layer circumference 120 and the lower baked layer circumference 130 may have equal diameters.

Further, the delivery system 100 may further comprise at least one glaze layer 310. In an embodiment, the at least one glaze layer 310 may be disposed atop the at least one baked layer 110. In such an embodiment, the at least one glaze layer 310 may transverse the mouth and be placed within the basin cavity. In an embodiment, the at least one glaze layer 310 is comprised of a confectionary product (i.e., a frosting mixture). However, the at least one glaze layer 310 may be comprised of any suitable confectionary product alternative (e.g., chocolate syrup, strawberry syrup, caramel, sprinkles, etc.).

In an embodiment, the at least one baked layer 110 may be comprised of at least one of a first baked layer, a second baked layer, a third baked layer, and a fourth baked layer. In such an embodiment, the first baked layer, the second baked layer, the third baked layer, and the fourth baked layer may be formed from at least one baked good. As a nonlimiting example, a first cupcake may be cut in half, which may form at least one of the first baked layer, the second baked layer, the third baked layer, and the fourth baked layer. In a further nonlimiting example, a second cupcake may be cut in half to form at least one of the first baked layer, the second baked layer, the third baked layer, and the fourth baked layer. In a further nonlimiting example, the first baked layer may be comprised of a first cupcake and the second baked layer may be comprised of a second cupcake.

In a further embodiment, the at least one glaze layer 310 may be comprised of at least one of a first glaze layer, a second glaze layer, a third glaze layer, and a fourth glaze layer. In an embodiment, the first baked layer may be placed within the storage basin. In such an embodiment, the lower baked layer circumference 130 of the first baked layer may abut the base of the storage basin. Moreover, the first glaze layer may be applied to the first baked layer, such that the first glaze layer is disposed upon the upper baked layer circumference 120 of the first baked layer. In an embodiment, the second baked layer may be placed atop the first glaze layer, such that the lower baked layer circumference 130 of the second baked layer abuts the first glaze layer. Furthermore, the second glaze layer may be applied to the second baked layer, wherein the second glaze layer is disposed upon the upper baked layer circumference 120 of the second baked layer. In an alternative embodiment, the third baked layer may be placed atop the second glaze layer, such that the lower baked layer circumference 130 of the third baked layer abuts the second glaze layer. Additionally, the third glaze layer may be applied to the third baked layer, wherein the third glaze layer is disposed upon the upper baked layer circumference 120 of the third baked layer. In yet a further embodiment, the fourth baked layer may be placed atop the third glaze layer, such that the lower baked layer circumference 130 of the fourth baked layer abuts the third glaze layer. Further, the fourth glaze layer may be applied to the fourth baked layer, wherein the fourth glaze layer is disposed upon the upper baked layer circumference 120 of the fourth baked layer.

In an embodiment, the first baked layer may be placed within the storage basin, such that the lower baked layer circumference 130 of the first baked layer abuts the base of the storage basin. In such an embodiment, the first baked layer is the first cupcake. Further, the first glaze layer may be applied to the first baked layer, such that the first glaze layer is disposed upon the upper baked layer circumference 120 of the first baked layer. In another embodiment, the second baked layer may be placed atop the first glaze layer, such that the lower baked layer circumference 130 of the second baked layer abuts the first glaze layer, wherein the second baked layer is the second cupcake. Moreover, the second glaze layer may be applied to the second baked layer, wherein the second glaze layer is disposed upon the upper baked layer circumference 120 of the second baked layer.

The delivery system 100 may be further comprised of the concealment label. In an embodiment, the concealment label 270 is disposed upon the delivery apparatus 210. In such an embodiment, the concealment label 270 may be disposed upon an outside surface of the basin sidewall 260. In another embodiment, the concealment label 270 may be configured to conceal at least a portion of one of the at least one baked layer 110 and the at least one glaze layer 310. Said concealment label 270 may hide one or more streaks on an inside surface of the basin sidewall 260, wherein the one or more streaks are caused by at least one of the at least one baked layer 110 and the at least one glaze layer 310. In an embodiment, the concealment label 270 may be a heat-shrink label. In an alternative embodiment, the concealment label 270 may be a screen printed label. As a nonlimiting example, the concealment label 270 may obscure imperfections created as a result of using a regular-mouth mason jar. In another nonlimiting example, the concealment label 270 may obscure at least one of the first glaze layer, the second glaze layer, the third glaze layer, and the fourth glaze layer disposed between at least one of the first baked layer, the second baked layer, the third baked layer, and the fourth baked layer such that the result is an aesthetically pleasing delivery apparatus. The concealment label 270 may be opaque, such that the contents of the basin adjacent to the concealment label 270 are not visible from outside the basin. Accordingly, the basin may be transparent, such that unobstructed contents of the basin adjacent to the basin are visible from outside the basin. The concealment label 270 may be annular and continuous, such that the concealment label 270 surrounds the basin and/or the basin sidewall 260.

The delivery system 100 may further comprise a concealment banner 410 disposed on the outer surface of the basin sidewall 260. The concealment banner 410 may be disposed above the concealment label. The concealment banner 410 may include one or more of the characteristics of the concealment label, for example, the opaque nature and/or the annular geometry. In an embodiment, the concealment label 270 may be configured and sized to obscure the upper baked layer circumference 120 of the first baked layer, a first glaze layer, and/or the lower baked layer circumference 130 of the second baked layer; and the concealment banner 410 may be configured and sized to obscure the upper baked layer circumference 120 of the second baked layer and/or a lower portion of the second glaze layer. Thus, the position of the concealment label 270 and the concealment banner 410 may facilitate a visual blockade of the interfacing portions of the first baked layer, the second baked layer, the first glaze layer, and/or the second glaze layer. In such an instance, the transparent portions of the delivery system 100, for example, defined by the space on the basin sidewall 260 below the concealment label 270, between the concealment label 270 and the concealment banner 410, and above the concealment banner 410. Therefore, a first window 420 may be formed along the basin sidewall 260 below the concealment label, a second window 430 may be formed along the basin sidewall 260 between the concealment label 270 and the concealment banner 410, and/or a third window 440 may be formed along the basin sidewall 260 above the concealment banner 410.

In an embodiment, each of the baked layers includes a flexibility, springiness, or elasticity that permits the sidewall of each baked layer to conform to the abutting geometry of the basin sidewall 260. Each of the baked layers may be composed of a material sufficiently flexible to allow the upper baked layer circumference 120 and/or the lower baked layer circumference 130 to compress to the inner circumference of the basin sidewall 260. Accordingly, the baked layer may be adapted such that the baked layer (e.g., a cupcake) may be inserted through the mouth, wherein the mouth is of a lesser circumference than the upper and/or lower circumference of the baked layer. In such an embodiment, the baked layer may be adapted to return to a circumference greater than that of the mouth, for example, after the baked layer passes through the mouth. Yet further, in such an embodiment, once the baked layer has passed the mouth, the baked layer may, as a function of the baked layer elasticity, expand to the inner dimensions of the basin sidewall 260. Therefore, the baked layers (e.g., cupcakes) may offer the appearance of uniform cylindrical baked members, while the smear artifacts created along the basin sidewall 260 during the insertion of the baked layer are obscured by the concealment label 270 and/or concealment banner 410 schema. In an embodiment, any cake material smear residue along the basin sidewall 260 may be visually obscured by: (1) the concealment label 270 and/or concealment banner 410 schema; and/or (2) the visual blending effect manifested by the abutment of cake material to cake material residue. For example, a cake material smear created by insertion of the first baked layer may be visually obscured by the compression of the second baked layer against said cake material smear. In effect, the human eye may not be astute at perceiving the contrast between a cake material smear and the cake material comprising a baked layer.

As contemplated above, the baked layer (e.g., a cupcake) may include a degree of elasticity, wherein the baked layer may be configurable in a compressed state and a natural state. The natural state of the baked layer may be the state of the baked layer when the baked layer experiences no inward force or pressure. The compressed state of the baked layer may be the state of the baked layer when the baked layer experiences inward force or pressure, for example, exerted by the inner surface of the basin. Thus, in the natural state, the baked layer may have a greater upper circumference than lower circumference. However, in the compressed state, the baked layer may have an equal upper circumference and lower circumference and/or an upper circumference and lower circumference equal to the circumference of the inner surface of the basin abutting said baked layer. Yet further, the compressed state of a baked layer may be actuated by, after insertion to the basin, a downward force, which in combination with the inward force of the basin walls on the sidewall of the baked layer, may cause the height of the baked layer to decrease, while the lower circumference of said baked layer increases to meet the circumference of the inner surface of the basin.

Figure 4:
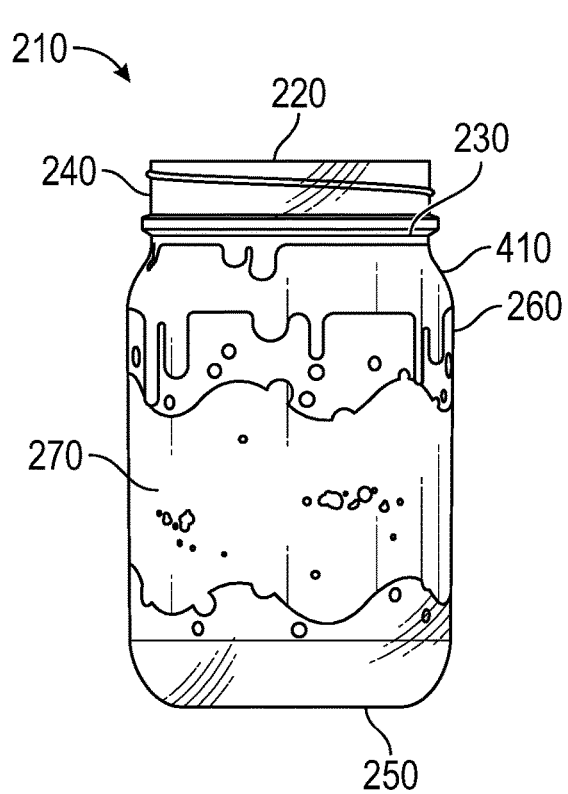
FIG. 4 is an illustration of an embodiment of a delivery apparatus.
Figure 5:
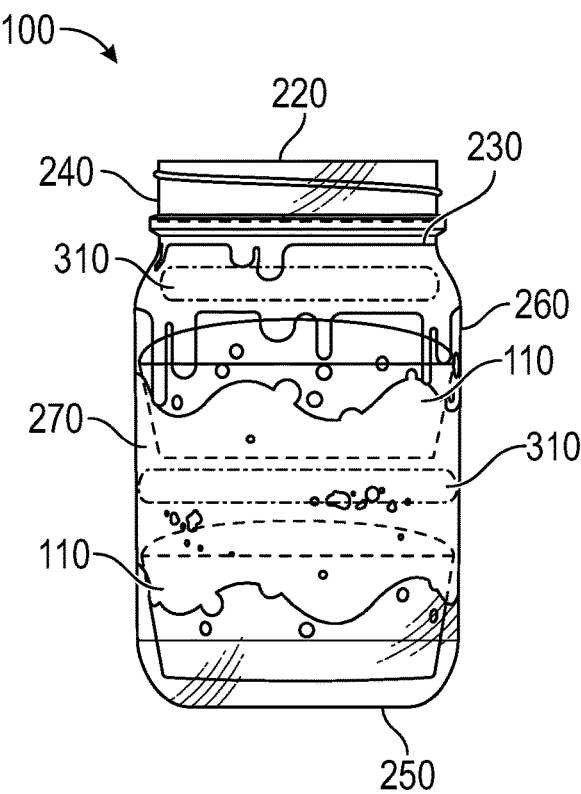
FIG. 5 is an illustration of an embodiment of a confectionary goods delivery system.

Referring to FIGS. 4-5, the system 100 may include a concealment label 270 and/or a concealment banner 410 configured in a stylized manner, such that the concealment label 270 and/or the concealment banner 410 conceal the interfacing of the baked layers and/or the glaze layers, while providing a silhouette having relevant aesthetic characteristics (e.g., ice cream drip designs or other confectionary-adjacent design elements).

Figure 6:
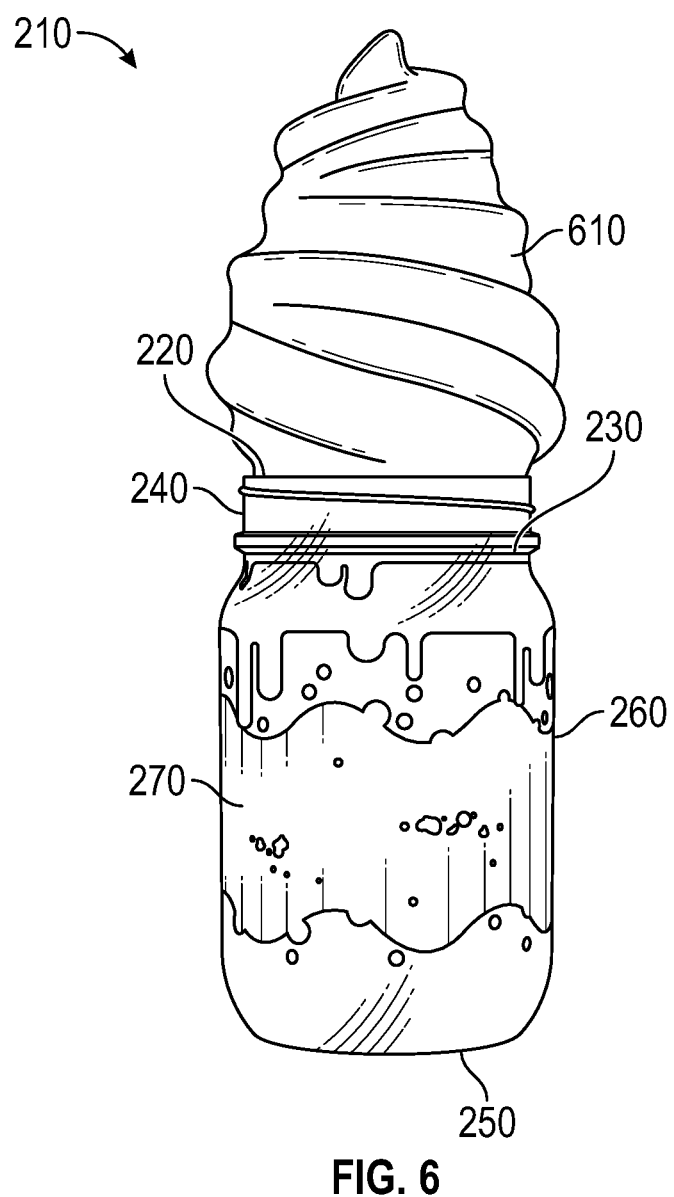
FIG. 6 is an illustration of an embodiment of a delivery apparatus.

Referring to FIG. 6, the delivery system 100 may be further comprised of a delivery apparatus topper 610. In an embodiment, the delivery apparatus topper 610 may be disposed within the mouth of the delivery apparatus. The delivery apparatus topper 610 (the "topper") may be mold-formed and/or consumable. In an embodiment, the topper 610 may be comprised of a primary ingredient, wherein said ingredient may comprise a chocolate mixture. In another embodiment, the chocolate mixture may be primarily white chocolate. In such an embodiment, the white chocolate mixture may allow for other ingredients and/or dyes to be added. The addition of other ingredients and/or dyes to the chocolate mixture may allow for the creation of different colored toppers. However, the mixture encompassing the topper 610 may include any type or category of chocolate or suitable chocolate alternative. The topper 610 may include a body comprising a top portion, and a base portion. In an embodiment, the top portion of the topper 610 may be fabricated into one or more geometric elements (i.e., an ice cream swirl). As a non-limiting example, said top portion may be hollow, forming a cavity, which may allow for the topper 610 to store a secondary ingredient. Additionally, the secondary ingredient may be embedded in a wall of the top portion as a second means for carrying the secondary ingredient. Thus, the secondary ingredient may be deposited within the hollow cavity of the topper 610 and/or may be embedded in the sidewall(s) of the topper 610. For the purposes of this disclosure, the term "secondary ingredient" should be interpreted to include one or more ingredients. For example, the secondary ingredient may be marshmallows, sprinkles, and/or a cocoa mix. In an embodiment, the base portion may transverse the upper aperture 220 of the mouth. In such an embodiment, a bottom surface of the base portion may be flush with the lower aperture 230.

Figure 7A:
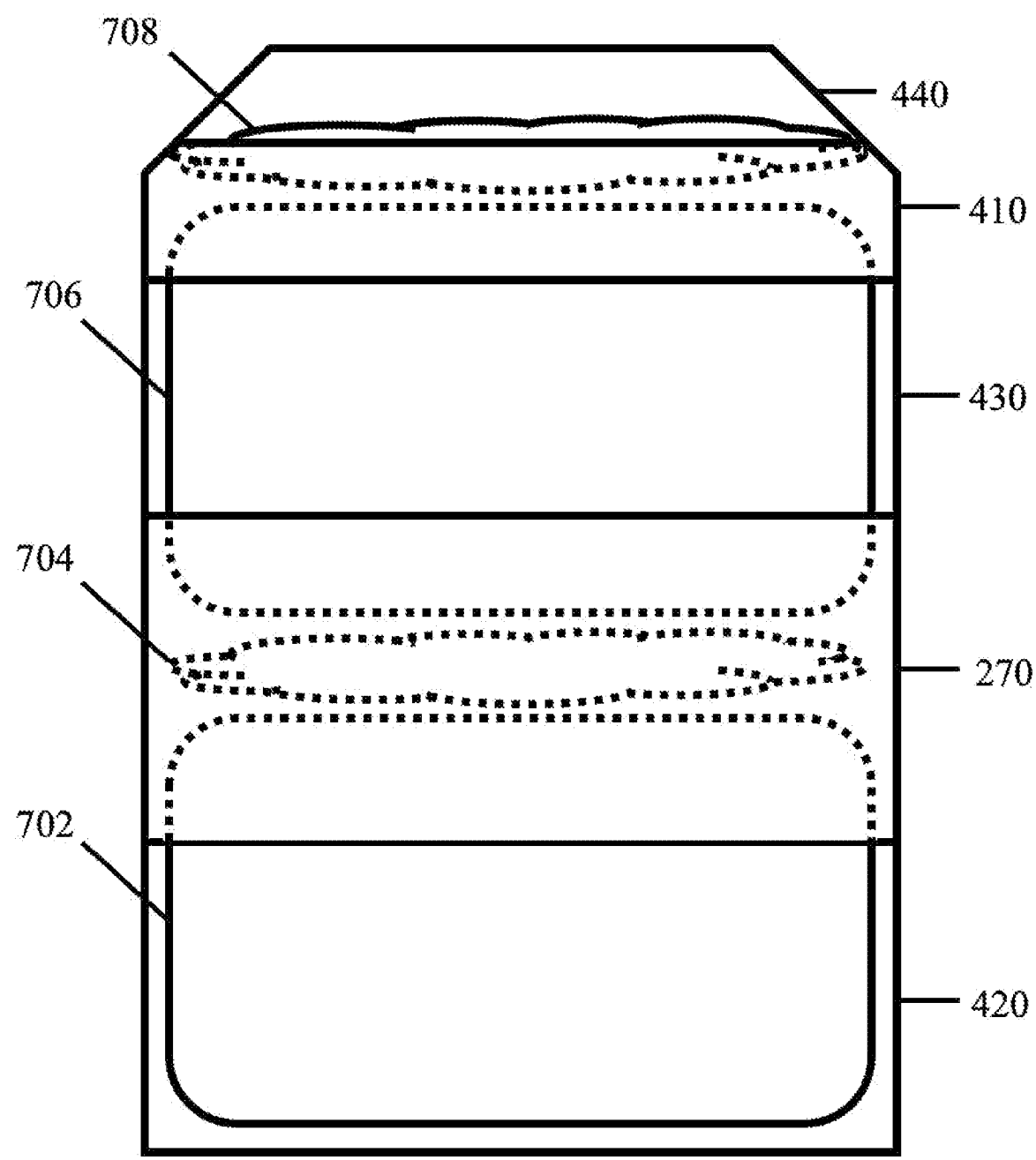
FIG. 7A is an illustration of an embodiment of a confectionary goods delivery system.
Figure 7B:
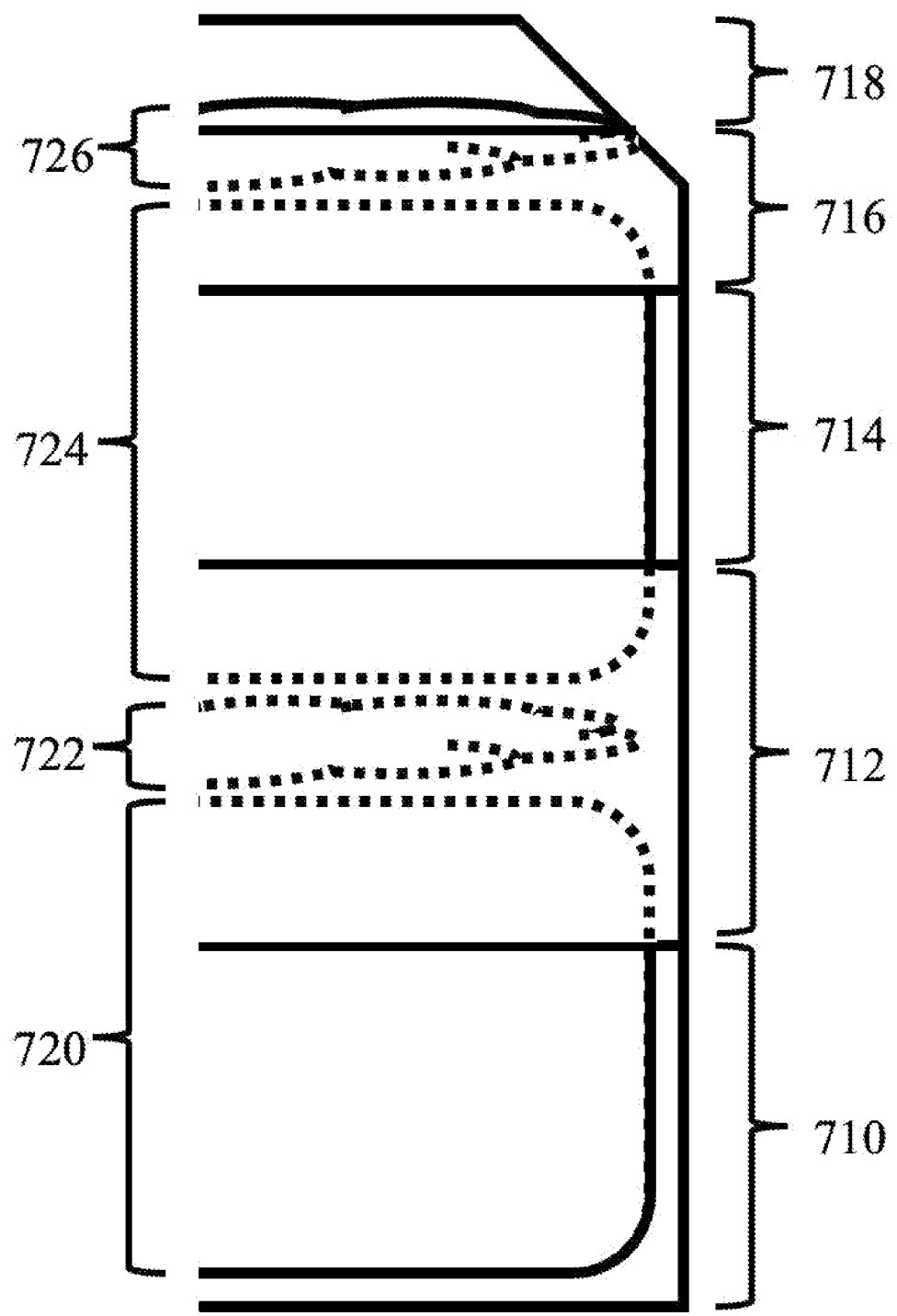
FIG. 7B is an illustration of an embodiment of a cross-section of a confectionary goods delivery system.

FIGS. 7A-7B illustrate a simplified illustration of an embodiment of the delivery system 100. Delivery system 100 may comprise a first baked layer 702, a first glaze layer 704, a second baked layer 706, and a second glaze layer 708. Each of the first baked layer 702 and the second baked layer 706 may embody the characteristics described herein in reference to the at least one baked layer 110. Each of the first glaze layer 704 and the second glaze layer 708 may embody the characteristics described herein in reference to the at least one glaze layer 310. The delivery system 100 may be adorned with the concealment label 270 and the concealment banner 410, such that a first window 420, a second window 430, and a third window 440 are formed along the portions of the basin sidewall 260 not obstructed by the concealment label 270 and/or the concealment banner 410.

The first baked layer 702 may be sized with a first baked layer height 720, the first glaze layer 704 may be sized with a first glaze layer height 722, the second baked layer 706 may be sized with a second baked layer height 724, and the second glaze layer 708 may be sized with a second glaze layer height 726. Further, the first window 420 may be sized with a first window height 710, the concealment label 270 may be sized with a concealment label height 712, the second window 430 may be sized with a second window height 714, the concealment banner 410 may be sized with a concealment banner height 716, and/or the third window 430 may be sized with a third window height 718. In an embodiment, the first baked layer height 720 is equal to the second baked layer height 724. In a further embodiment, the first glaze layer height 722 is equal to the second glaze layer height 726. The first baked layer height 720 and/or the second baked layer height 724 may be greater than the first glaze layer height 722 and/or the second glaze layer height 726. The first baked layer height 720 may be greater than the first window height 710 and/or the second baked layer height 724 may be greater than the second window height 714.

In an embodiment, the first baked layer 702 may be inserted into the basin, wherein, upon entry, the first baked layer 702 may apply a baked layer material residue to the inner surface of the basin sidewall 260, the first glaze layer 704 may be applied to the top surface of the first baked layer 702 by piping the glaze layer material directly into the basin. Further, the second baked layer 706 may be inserted into the basin, wherein, upon entry, the second baked layer 706 may apply a baked layer material residue to the inner surface of the basin sidewall 260, the second glaze layer 708 may be applied to the top surface of the second baked layer 706 by piping the glaze layer material directly into the basin. The piping of the glaze layer material may be adapted such that the nozzle of the piping apparatus may be inserted sufficiently deep into the basin as to avoid undesired application of the glaze layer residue to the inner surface of the basin sidewall 260. In an embodiment, the concealment layer height 712 may be greater than the first glaze layer height 722. In one embodiment, if baked layer material residue exists within the third window 440 and/or within the mouth, and the baked layer material residue is undesired in such a configuration, the baked layer material residue within close proximity to the mouth and/or along the third window 440 may be cleaned with a cloth or other similar item. Accordingly, while cleaning the bottom portions of the inside surface of the basin sidewall 260 is difficult during deposition of the first cake layer 702, the first glaze layer 704, and/or the second baked layer 706, the proximity of the third window 440 to the mouth may enable manual cleaning of such a surface.

The first window 420, the second window 430, and/or the third window 440 may be portions of the basin, wherein the concealment label 270 and/or concealment banner 410 are not obstructing visualization of the contents of the basin. Thus, the transparent nature of the basin permits visualization of the contents via the windows 420-440. In an alternate embodiment, the first window 420, the second window 430, and/or the third window 440 may include a material disposed across said windows 420-440, wherein said material is sufficiently transparent.

Further implementation of the components and methods described herein may be permit use of any number or combination of baked layers, glaze layers, concealment components (e.g., labels or banners), and/or windows to manifest a system 100 of any suitable configuration. As a nonlimiting example, a system 100 may be composed of a narrow-mouth mason jar adorned with three concealment labels and four windows, wherein three cupcakes and three glaze layers may be positioned (as described above) within the mason jar to provide obscurement of the interfacing portions thereof.

For the purposes of this disclosure, broken line may be utilized in the figures to demonstrate portions of the system 100 components where visualization is obstructed.

Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

Various elements, which are described herein in the context of one or more embodiments, may be provided separately or in any suitable subcombination. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

All references, patents and patent applications and publications that are cited or referred to in this application are incorporated in their entirety herein by reference. Finally, other implementations of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A confectionary goods delivery system comprising:
    a delivery apparatus comprising:
        a mouth comprising an upper aperture, and a lower aperture;
        a storage basin; and
        a concealment label disposed upon an outside surface of the storage basin,
    a delivery apparatus topper disposed within the mouth;
    at least one baked layer disposed within the storage basin, the at least one baked layer comprising:
        an upper baked layer circumference;
        a lower baked layer circumference,
            the lower baked layer circumference having a smaller diameter than that of the upper baked layer circumference; and
        a baked layer sidewall disposed between the upper baked layer circumference and the lower baked layer circumference; and
    at least one glaze layer disposed atop the at least one baked layer.

2. The confectionary goods delivery system of claim 1, wherein the concealment label is configured to conceal the at least one glaze layer.

3. The confectionary goods delivery system of claim 1, wherein the concealment layer is a heat-shrink label.

4. The confectionary goods delivery system of claim 1, wherein the at least one baked layer comprises:
    a first baked layer; and
    a second baked layer.

5. The confectionary goods delivery system of claim 4, wherein the at least one glaze layer comprises:

a first glaze layer disposed between the first baked layer and the second baked layer; and a second glaze layer disposed atop the second baked layer.

6. The confectionary goods delivery system of claim 1, wherein the at least one baked layer is a cupcake.

7. The confectionary goods delivery system of claim 1, wherein the at least one glaze layer is a frosting mixture.

8. The confectionary goods delivery system of claim 1, wherein the delivery apparatus topper is comprised of a chocolate mixture.

9. The confectionary goods delivery system of claim 1, wherein the delivery apparatus topper further comprises a hollow cavity.

10. The confectionary goods delivery system of claim 9, wherein the hollow cavity is filled with a secondary ingredient.

11. A confectionary goods delivery system comprising:
a delivery apparatus comprising;
a mouth comprising, an upper aperture, and a lower aperture,
a storage basin,
a concealment banner disposed upon an outside surface of the storage basin,
a concealment label disposed upon an outside surface of the storage basin, and
a delivery apparatus topper disposed within the mouth, the delivery apparatus topper comprising; a hollow cavity, and a filling disposed within the hollow cavity;
a first baked layer disposed within the storage basin, the first baked layer comprising:
a first upper baked layer circumference,
a first lower baked layer circumference,
the first lower baked layer circumference having a smaller diameter than the first upper baked layer circumference, and
a first baked layer sidewall angularly disposed between the first upper baked layer circumference and the first lower baked layer circumference;
a second baked layer disposed within the storage basin, the second baked layer comprising:
a second upper baked layer circumference,
a second lower baked layer circumference,
the second lower baked layer circumference having a smaller diameter than the second upper baked layer circumference, and
a second baked layer sidewall angularly disposed between the second upper baked layer circumference and the second lower baked layer circumference;
a first glaze layer disposed between the first upper baked layer circumference and the second lower baked layer circumference; and
a second glaze layer disposed atop the second upper baked layer.

12. The confectionary goods delivery system of claim 11, wherein the first baked layer is a first cupcake.

13. The confectionary goods delivery system of claim 11, wherein the second baked layer is a second cupcake.

14. A confectionary goods delivery system comprising:
a delivery apparatus comprising:
a mouth comprising an upper aperture, and a lower aperture;
a storage basin comprising an inner surface and an outside surface,
wherein the inner surface of the storage basin is wider than the mouth;
a concealment banner disposed upon the outside surface of the storage basin;
a concealment label disposed upon the outside surface of the storage basin and below the concealment banner,
wherein the concealment banner and the concealment label are opaque,
a first window defined along the outside surface below the concealment label;
a second window defined along the outside surface between the concealment label and the concealment banner;
a third window defined along the outside surface above the concealment banner,
wherein the first window, the second window, and the third window are transparent;
a delivery apparatus topper disposed within the mouth;
a first baked layer disposed within the storage basin, the first baked layer disposed adjacent to the first window and a portion of the concealment label, the first baked layer comprising:
a first baked layer height;
a first upper baked layer circumference;
a first lower baked layer circumference,
the first lower baked layer circumference having a smaller diameter than the first upper baked layer circumference; and
a first baked layer sidewall angularly disposed between the first upper baked layer circumference and the first lower baked layer circumference,
wherein the first baked layer sidewall is configured to conform to the inner surface of the storage basin;
a second baked layer disposed within the storage basin, the second baked layer disposed adjacent to a portion of the concealment label, the second window, and the concealment banner, the second baked layer comprising:
a second baked layer height,
wherein the second baked layer height is equal to the first baked layer height;
a second upper baked layer circumference;
a second lower baked layer circumference,
the second lower baked layer circumference having a smaller diameter than the second upper baked layer circumference; and
a second baked layer sidewall angularly disposed between the second upper baked layer circumference and the second lower baked layer circumference,
wherein the second baked layer sidewall is configured to conform to an inner surface of the storage basin;
a first glaze layer disposed between the first upper baked layer circumference and the second lower baked layer circumference; and
a second glaze layer disposed atop the second upper baked layer, the second glaze layer disposed adjacent to a portion of the concealment banner and a portion of the third window.

* * * * *